United States Patent [19]

Sone et al.

[11] 4,134,026
[45] Jan. 9, 1979

[54] MECHANICAL SWITCH CIRCUIT COMPRISING CONTACT CONDITIONING MEANS

[75] Inventors: Kiyoshi Sone; Ichiro Yoshihara, both of Tokyo, Japan

[73] Assignee: Ricoh Company, Ltd., Tokyo, Japan

[21] Appl. No.: 804,343

[22] Filed: Jun. 7, 1977

[30] Foreign Application Priority Data

Jun. 11, 1976 [JP] Japan ............................. 51/67733

[51] Int. Cl.² ...................... H01H 9/30; H01H 36/00
[52] U.S. Cl. ............................. 307/137; 307/132 M; 307/247 A
[58] Field of Search ............... 307/137, 138, 132 R, 307/96–108; 179/2 AM; 340/365 E; 324/158 D; 361/245, 435; 400/144 AP, 144 R, 145, 6 R; 320/1

[56] References Cited

U.S. PATENT DOCUMENTS 3,541,347  11/1970  Carmack ..................... 307/132 R Primary Examiner—L. T. Hix
Assistant Examiner—S. D. Schreyer
Attorney, Agent, or Firm—David G. Alexander

[57] ABSTRACT

Two reed switches are alternately closed by a magnet rotating with a shaft of a water meter or the like which is to be read remotely. A capacitor discharges through the reed switches when the same are closed, increasing the switch current without increasing the external power source current, thereby producing temporary partial fusion of the switch contacts and maximum contact effectiveness. A low-pass filter and a snap action circuit such as a Schmitt trigger are connected to the switches to eliminate the effects of contact bouncing and noise signals from the output of the circuit.

14 Claims, 11 Drawing Figures

MECHANICAL SWITCH CIRCUIT COMPRISING CONTACT CONDITIONING MEANS

BACKGROUND OF THE INVENTION

The present invention relates to a mechanical switch circuit comprising contact conditioning means which is ideally suited to a system for remote reading of utility meters or the like.

The high cost of personnel for reading utility meters has led to the development of remote reading systems. Taking a water meter as an example, a mechanical switch may be connected to the internal gearing of the meter such as to close each time one liter of water is consumed. The switch is connected through cables to a remote utility station which senses each time the switch is closed.

These systems are coming into widespread use due to their inherent advantages over direct reading. However, several problems have remained heretofore unsolved which have prevented complete acceptance of such systems.

The first problem is the sensitivity of the system to noise produced in the cables connecting the meter switches to the remote utility station. Since these cables must often be quite long, many opportunities for the introduction of electrical noise are present. Noise pulses cause erroneous operation of the sensing means in the utility station and result in overly high readings and overbilling of the utility consumer. The time required for investigation and correction of the erroneous billing may exceed the time required for direct reading of the meter, thus obviating the advantage of the remote reading system.

Another related problem is erroneous operation of the sensing means caused by bouncing of the switch contacts. When a mechanical switch is closed, the contacts bounce against each other as many as several hundred times before mechanical and electrical equilibrium is reached. Each opening and closing of the contacts gives rise to an electrical pulse which can be counted by the remote sensing means. Thus, contact bouncing also produces erroneously high readings and overbilling.

The bouncing phenomenon becomes worse with time due to the deterioration of the switch. A related but opposite phenomenon is the increase in the contact resistance caused by deterioration. In extreme cases the resistance may become so high that some switch closures may not be detectd by the sensing means. The combination of contact bouncing which produces erroneously high readings and increased contact resistance which produces erroneously low readings may result in utility readings which are totally unrelated to the amount of the utility consumed.

The effects of contact bouncing and deterioration may be minimized by passing a large amount of current through the switch contacts. This causes temporary partial fusion of the contact surfaces which maximizes the contact efficiency and rejuvenates the contacts at each closure. Although it is desirable to provide such an effect in a remote utility reading system, such has been heretofore been impractical due to the high power requirement.

SUMMARY OF THE INVENTION

In accordance with the present invention two reed switches are alternately closed by a magnet rotating with a shaft of a water meter or the like which is to be read remotely. A capacitor discharges through the reed switches when the same are closed, increasing the switch current without increasing the external power source current, thereby producing temporary partial fusion of the switch contacts and maximum contact effectiveness. A low-pass filter and a snap action circuit such as a Schmitt trigger are connected to the switches to eliminate the effects of contact bouncing and noise signals from the output of the circuit.

It is an object of the present invention to provide a mechanical switch circuit comprising an improved contact conditioning or debouncing means which is suited for remote reading of utility meters and the like, provides reliable operation and is resistant to the effects of contact bouncing, deterioration and externally produced electrical noise.

It is another object of the present invention to provide a mechanical switch circuit comprising unique means for increasing the current flow through switch contacts without increasing the external power source requirements.

It is another object of the present invention to provide a mechanical switch circuit which automatically rejuvenates switch contacts upon closure thereof and increases the contact effectiveness and service life of the contacts over the prior art.

It is another object of the present invention to provide a generally improved mechanical switch circuit for remote meter reading.

Other objects, together with the foregoing, are attained in the embodiments described in the following description and illustrated in the accompanying drawing.

DESCRIPTION OF THE PREFERRED EMBODIMENTS

While the mechanical switch circuit of the invention is susceptible of numerous physical embodiments, depending upon the environment and requirements of use, substantial numbers of the herein shown and described embodiments have been made, tested and used, and all have performed in an eminently satisfactory manner.

Figure 1:
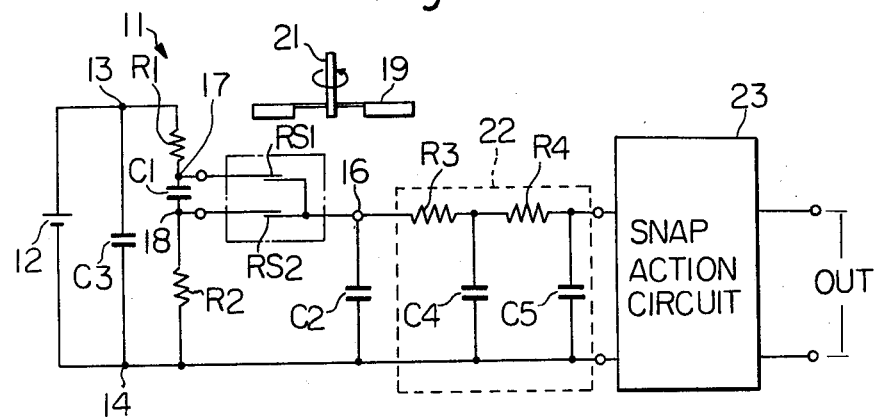
FIG. 1 is an electrical schematic diagram, partly in block form, of a mechanical switch circuit embodying the present invention.

Referring now to FIG. 1, a mechanical switch circuit embodying the present invention is generally designated by the reference numeral 11 and comprises a D.C. power source which is symbolically shown as a battery 12. A first resistor $R_1$, second resistor $R_2$ and first capacitor $C_1$ are connected in series between first and second ends of the battery 12 or circuit points 13 and 14 respectively in such a manner that the capacitor $C_1$ is connected between the resistors $R_1$ and $R_2$. A second capacitor $C_2$ is connected at a second end thereof to the point 14. Reed switches $RS_1$ and $RS_2$ are connected between a first end of the capacitor $C_2$ or circuit point 16 and first and second ends of the capacitor $C_1$ or circuit points 17 and 18 respectively. A magnet assembly 19 is fixed for rotation with a shaft 21 of a water meter or the like (not shown). The reed switches $RS_1$ and $RS_2$ are normally open and adapted to be alternately closed by the magnet assembly 19 each time the shaft 21 makes one revolution indicating that a unit amount of utility, such as 1 liter of water, has been consumed. A bypass capacitor $C_3$ is connected across the battery 12.

A low-pass filter 22 comprises a third resistor $R_3$ and a fourth capacitor $C_4$ which are connected in series across the points 16 and 14, the third resistor $R_3$ and the fourth capacitor $C_4$ constituting a first stage of the low-pass filter 22. A resistor $R_4$ and capacitor $C_5$ connected across the capacitor $C_4$ constitute a second stage of the low-pass filter 22. An input of a snap action circuit 23 is connected across the capacitor $C_5$, an output of the snap action circuit 23 constituting an output of the switch circuit 11.

Figure 3:
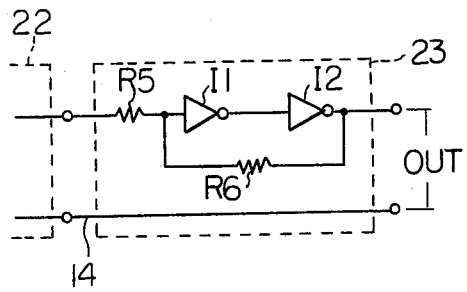
FIG. 3 is an electrical schematic diagram of a first embodiment of a snap action circuit.

As shown in FIG. 3, the snap action circuit 23 is constituted by a Schmitt trigger comprising first and second cross-coupled inverters $I_1$ and $I_2$ respectively. More specifically, the junction of the resistor $R_4$ and capacitor $C_5$ of the low-pass filter 22 is connected through a resistor $R_5$ to an input of the inverter $I_1$. An output of the inverter $I_1$ is connected directly to an input of the circuit 11 and is connected through a feedback resistor $R_6$ to the input of the inverter $I_1$. The resistor $R_6$ allows summing of the output of the inverter $I_2$ with the voltage across the capacitor $C_5$. The resistor $R_5$ serves the dual function of the increasing the effective input impedance of the inverter $I_1$ and allowing summing of the voltage across the capacitor $C_5$ with the output of the inverter $I_2$. It is desirable that the input impedance of the snap action circuit 23 be as high as possible for reasons which will become apparent from description hereinbelow.

In operation, the reed switch $RS_1$ is closed by rotation of the magnet assembly 19 indicating consumption of the utility. The reed switch $RS_2$ is arranged to be subsequently closed after the reed switch $RS_1$ is opened upon further rotation of the shaft 21 and magnet assembly 19. Upon closure of the reed switch $RS_1$ at a time $t_1$ shown in FIGS. 2a and 2b, the capacitor $C_2$ begins to be charged through the resistor $R_1$ and reed switch $RS_1$. The peak current which flows through the resistor $R_1$ at the time $t_1$ has the value $V/r_1$ is the voltage of the battery 12 and $r_1$ is the resistance of the resistor $R_1$. However, prior to closure of the reed switch $RS_1$ the capacitor $C_1$ was charged up to the battery voltage V. With the capacitor $C_2$ initially discharged, the effect of closing the reed switch $RS_1$ is equivalent to shorting the point 17 to the point 14. Thus, the capacitor $C_1$ discharges through the resistor $R_2$ and reed switch $RS_1$, the peak current flow through the resistor $R_2$ being $V/r_2$, where $r_2$ is the resistance of the resistor $R_2$.

Since the current which flows through both resistors $R_1$ and $R_2$ also flows through the reed switch $RS_1$, the peak current flow through the reed switch $RS_1$ at the time $t_1$ is $V/r_1 + V/r_2$. If the values of $R_1$ and $R_2$ are selected so that $r_1 = r_2$, the peak current flow through the reed switch $RS_1$ is twice as much as if the capacitor $C_1$ were not provided.

The capacitor $C_1$ provides substantially increased current flow through the reed switch $RS_1$ without a corresponding increase in the current from the battery 12, and causes temporary fusion of the contacts (not designated) of the reed switch $RS_1$. This increases the contact effectiveness and rejuvenates the contact surfaces. This is known in the art as the "cohere" or "fritting" effect. Thus, deterioration of the contacts of the reed switch $RS_1$, bouncing of the contacts and contact resistance are minimized. In a practical installation, the battery 12 is located far from the reed switches $RS_1$ and $RS_2$. Increasing the current supply from the battery 12 to provide temporary fusion of the contacts would result in greatly increased $I^2R$ losses in the connecting cables and an unacceptable loss of electrical power. However, the unique configuration of the capacitor $C_1$ increases the current flow through the reed switch $RS_1$ without increasing the current flow from the battery 12, thereby accomplishing the desired function with substantial economies.

Figure 2A:
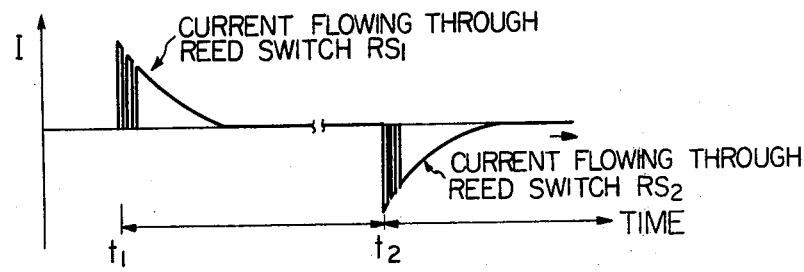
FIGS. 2a and 2b are graphs illustrating the operation of the present circuit.
Figure 2B:
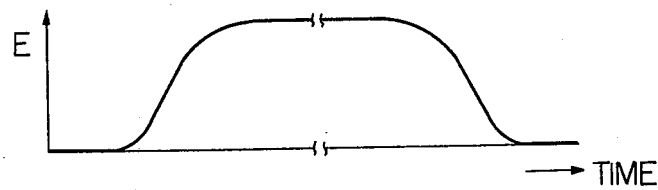

In FIGS. 2a and 2b, the abscissa axes represent time and the ordinate axes represent current I through the reed switch $RS_1$ or $RS_2$ (whichever is closed) and voltage E across the low-pass filter 22 respectively. It will be seen that at the time $t_1$ the current I attains its peak value and decreases exponentially as the capacitor $C_2$ is charged. The voltage E increases exponentially due to charging of the capacitor $C_2$ through the resistor $R_1$ and reed switch $RS_1$. Since the reed switch $RS_1$ has mechanical contacts, it is impossible to completely prevent contact bouncing, and in the same time immediately following $t_1$, FIG. 2a shows the effect of contact bouncing in that the current flow is reduced to zero a number of times as the contacts disengage.

The low-pass filter 22 and snap action circuit 23 serve to condition or debounce the contacts of the reed switches $RS_1$ and $RS_2$. These circuits do not affect the switch contacts per se but rather serve to remove the effects of the switch contact bounce from the signal output. The capacitor $C_1$ serves, in addition to increasing the current flow through the reed switches $RS_1$ and $RS_2$, the dual function of suppressing noise appearing on the relatively long signal lines between the reed switches $RS_1$ and $RS_2$ and the circuit points 17 and 18. The capacitor $C_2$ serves to suppress noise appearing on the long signal lines between the reed switches $RS_1$ and $RS_2$ and the circuit point 16. The capacitor $C_3$ serves to suppress noise generated in the battery 12, which is replaced in actual practice by a D.C. power supply (not shown). The value of the resistors $R_1$ and $R_2$ and capacitors $C_1$ and $C_2$ are selected so that the charging time constant of the capacitor $C_2$ is long compared to the settling time of the contacts of the reed switches $RS_1$ and $RS_2$. Thus, the voltage E across the capacitor $C_2$ is substantially uneffected by the contact bouncing and increases and decreases smoothly as shown in FIG. 2b. The capacitors $C_1$, $C_4$ and $C_5$ are charged along with the capacitor $C_2$ and the rising output voltage of the low-pass filter 22 is applied to the input of the snap action circuit 23.

With the voltage applied to the inverter $I_1$ through the resistor $R_5$ below the upper trip point of the inverter $I_1$, the inverter $I_1$ produces a high output which causes the inverter $I_2$ to produce a low output. The low output of the inverter $I_2$ is summed through the resistor $R_6$ with the voltage applied through the resistor $R_5$ and tends to pull down the voltage at the input of the inverter $I_1$. When the capacitor $C_5$ has been charged to the extent that the voltage thereacross is above the upper trip point of the inverter $I_1$, the output of the inverter $I_1$ goes low and the output of the inverter $I_2$ goes high. The high output of the inverter $I_2$ pulls up the input of the inverter $I_1$ through the resistor $R_6$. In summary, before closure of the reed switch $RS_1$ the output of the inverter $I_2$ and thereby the circuit 11 is low. At a certain time after closure of the reed switch $RS_1$ the output of the inverter $I_2$ snaps to a high value. The capacitors $C_1$, $C_2$, $C_4$ and $C_5$ are charged up to the voltage V of the battery 12, after which time current flow through the circuit 11 drops to substantially zero. The high input impedance of the snap action circuit 23 prevents discharge of the capacitors $C_1$, $C_2$, $C_4$ and $C_5$ therethrough and thereby current flow through the circuit 11.

Between the time $t_1$ and a time $t_2$ which may be much later, the shaft 21 rotates to a position at which the reed switch $RS_1$ opens. However, this has no effect on the circuit, even if both reed switches $RS_1$ and $RS_2$ are left open for a prolonged period of time.

At the time $t_2$, the reed switch $RS_2$ is closed by the magnet assembly 19, causing the capacitor $C_2$ to discharge through the reed switch $RS_2$ and resistor $R_2$. The peak current flow through the resistor $R_2$ is $V/r_2$, since the capacitor $C_2$ was charged up to the voltage V. Since the capacitor $C_1$ was also charged up to V, closure of the reed switch $RS_2$ is equivalent to shorting the point 18 to the point 13. Thus, the capacitor $C_1$ discharges through the resistor $R_1$ and reed switch $RS_2$ with the peak value of current through the resistor $R_1$ being $V/r_1$. The combined current flow through the reed switch $RS_2$ is $V/r_1 + V/r_2$. Thus, the peak current flow through the reed switch $RS_2$ is the same as the peak current flow through the reed switch $RS_1$. However, the direction of current flow is just opposite as indicated in FIG. 2a.

As viewed in FIG. 2a, the contacts of the reed switch $RS_2$ bounce in the same manner as the contacts of the reed switch $RS_1$. However, due to the circuit time constant, the capacitor $C_2$ discharges, along with the capacitors $C_1$, $C_4$ and $C_5$ in a smooth manner as indicated in FIG. 2b. When the voltage across the capacitor $C_5$ drops below the lower trip point of the inverter $I_1$ the output of the inverter $I_1$ goes high and the output of the inverter $I_2$ goes low. The low output of the inverter $I_2$, which constitutes the output of the circuit 11, is applied to the input of the inverter $I_1$ as mentioned above and pulls the same down, thereby providing a hysterisis zone between the upper and lower trip points of the inverter $I_1$.

At a certain time after $t_2$, the reed switch $RS_2$ is opened by the magnet assembly 19 and the capacitor $C_1$ is charged up to V. However, there are no other changes in the circuit 11, even if both reed switches $RS_1$ and $RS_2$ are left open for a prolonged period of time since the capacitors $C_2$, $C_4$ and $C_5$ are discharged and disconnected from the point 13.

In summary, it will be seen that closure of the reed switch $RS_2$ causes the output of the inverter $I_2$ and thereby the circuit 11 to snap down to a low value. The output of the circuit 11 is a square pulse having a duration substantially equal to the length of time between closure of the reed switches $RS_1$ and $RS_2$. The rising edge of the pulse substantially corresponds to the time of closure of the reed switch $RS_1$. The falling edge of the pulse substantially corresponds to the time of closure of the reed switch $RS_2$. The pulse is completely clean and uneffected by bouncing of the contacts of the reed switches $RS_1$ and $RS_2$ and electrical noise introduced into the circuit 11 due to the action of the low-pass filter 22 and snap action circuit 23. Preferably, the low-pass filter 22 and snap action circuit 23 are provided at the remote utility station so as to best eliminate the effects of noise introduced into the connecting cables. Although the low-pass filter 22 is shown as having two stages, one or more than two stages can be provided. The low-pass filter 22 and snap action circuit 23 may be fabricated using CMOS integrated circuit technology, thus making them inexpensive, compact, light and reliable and also providing in-phase rejection (common-mode rejection) of noise.

Figure 4:
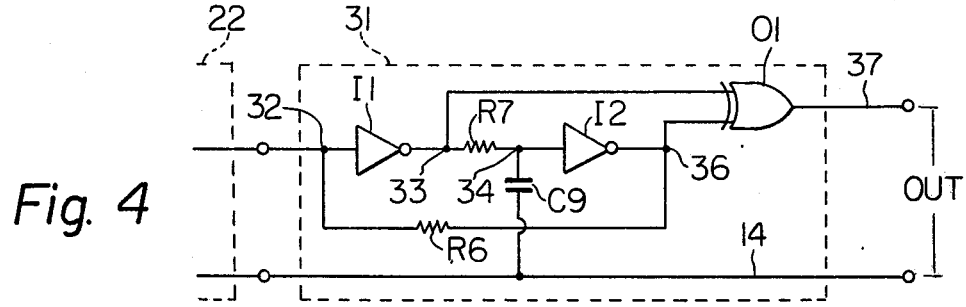
FIG. 4 is similar to FIG. 3 but shows a second embodiment.

Whereas the snap action circuit 23 provides one long square pulse for each revolution of the shaft 21, a modified snap action circuit 31 which is shown in FIG. 4 produces a short negative pulse each time the reed switch $RS_1$ or $RS_2$ is closed, or two pulses for each revolution of the shaft 21. In FIG. 4, like elements are designated by the same reference numerals as used in FIG. 3. In the snap action circuit 31, the resistor $R_5$ is omitted and the output of the low-pass filter 22 is connected directly to the input of the inverter $I_1$. A resistor $R_7$ is connected between the output of the inverter $I_1$ and the input of the inverter $I_2$. A capacitor $C_9$ is connected between the input of the inverter $I_2$ and the point 14. The input of the inverter $I_1$, output of the inverter $I_1$, input of the inverter $I_2$ and output of the inverter $I_2$ are designated as circuit points 32, 33, 34 and 36 respectively. An exclusive OR gate $O_1$ has inputs connected to outputs of the inverters $I_1$ and $I_2$ respectively. The output of the gate $O_1$ constitutes the output of the snap action circuit 31 and is designated as a circuit point 37. FIGS. 5a to 5e illustrate the voltages at the points 32, 33, 34, 36 and 37 as functions of time. The inverters $I_1$ and $I_2$ are assumed as each being provided with a hysterisis function.

At the time $t_1$ the voltage at the point 32 is low, causing the inverter $I_1$ to produce a high output and the inverter $I_2$ to produce a low output. Since the voltages at the inputs of the gate $O_1$ are dissimilar, the output of the gate $O_1$ is high.

Figure 5A:
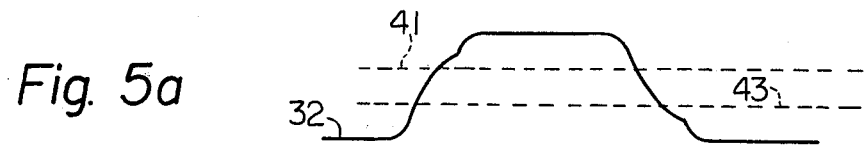
FIGS. 5a and 5e are graphs illustrating the operation of the snap action circuit of FIG. 4.
Figure 5B:
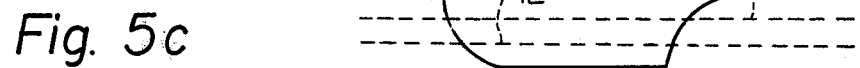
Figure 5C:
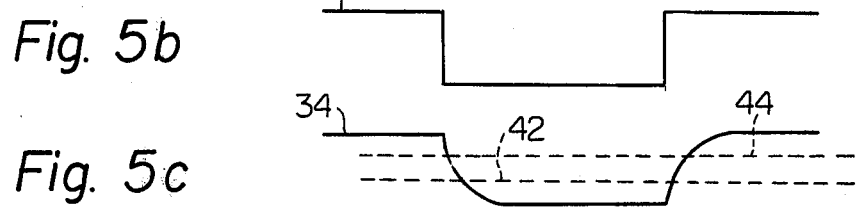
Figure 5D:
Figure 5E:
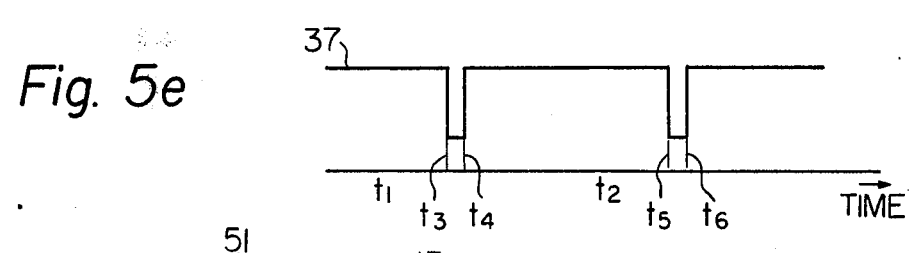

After the reed switch $RS_1$ is closed and the capacitor $C_5$ is charged to the extent that the voltage at the point 32 reaches the upper trip point of the inverter $I_1$ as indicated by a line 41 in FIG. 5a, which occurs at a time $t_3$, the output of the inverter $I_1$ goes low. Since the outputs of the inverters $I_1$ and $I_2$ are both low, the gate $O_1$ produces a low output. The capacitor $C_9$ discharges through the resistor $R_7$ and inverter $I_1$ until the voltage at the point 34 drops below the lower trip point of the inverter $I_2$ which is indicated by a line 42 in FIG. 5c. This occurs at a time $t_4$. The output of the inverter $I_2$ goes high. As can be seen in FIG. 5a, at the time $t_4$, the high output of the inverter $I_2$ is summed with the voltage across the capacitor $C_5$ so that the voltage at the point 32 increases at a higher rate. Since the inputs of the gate $O_1$ are again dissimilar, the gate $O_1$ produces a high output. In summary, the exclusive OR gate $O_1$ produces a negative pulse between the times $t_3$ and $t_4$ shortly after the reed switch $RS_1$ is closed.

Opening of the reed switch $RS_1$ has no effect on the circuit 31. However, when the reed switch $RS_2$ is closed at time $t_2$, the voltage at the circuit point 32 decreases. When the voltage at the point 32 drops below the lower trip point of the inverter $I_1$ which is indicated by a line 43 in FIG. 5a, the output of the inverter $I_1$ goes high and the capacitor $C_9$ starts to be charged through the inverter $I_1$ and resistor $R_7$. This occurs at a time $t_5$. Since the inputs of the gate $O_1$ become similar, more specifically both high, the output of the gate $O_1$ again goes negative. When the capacitor $C_9$ is charged to the extent that the voltage at the point 34 exceeds the upper trip point of the inverter $I_2$ which is indicated by a line 44 in FIG. 5c, the output of the inverter $I_2$ goes low. This occurs at a time $t_6$. Since the inputs of the gate $O_1$ again become dissimilar, the gate $O_1$ produces a high output. At the time $t_6$, the low output of the inverter $I_2$ is summed with the voltage across the capacitor $C_5$ causing the voltage at the point 32 to drop at a faster rate. Thus, it will be seen that the gate $O_1$ produces a negative pulse between the times $t_5$ and $t_6$.

Figure 6:
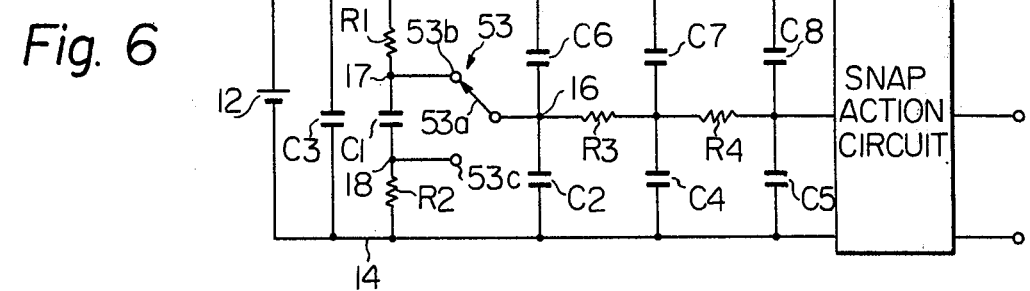
FIG. 6 is similar to FIG. 1 but shows a modified embodiment of the present invention.

FIG. 6 shows a modified switch circuit of the invention which is designated as 51. Again, like elements are designated by the same reference numerals. The circuit 51 comprises fifth, sixth and ninth capacitors $C_6$, $C_7$ and $C_8$ which are connected between the capacitors $C_2$, $C_4$ and $C_5$ respectively and the point 13. This provides a balanced or symmetrical arrangement relative to the ends of the battery 12 which is desirable in certain applications. For instance, this serves to improve in-phase rejection of noise. The snap action circuit is modified to conform to this configuration and is designated as 52.

As a further point of difference the reed switches $RS_1$ and $RS_2$ are replaced by a single pole, double throw switch 53 which comprises a movable contact 53a connected to the point 16 and two fixed contacts 53b and 53c. The movable contact 53a is selectively engageable with the fixed contacts 53b and 53c which are connected to the points 17 and 18 respectively. The switch 53 is preferably operable by means of a cam (not shown) fixed to the shaft of the utility meter in such a manner as to alternately connect the point 16 to the points 17 and 18 during each revolution of the shaft.

Thus, it will be seen that the present invention provides a mechanical switch circuit comprising an improved contact conditioning means which is especially suited for applications involving remote reading of utility meters and the like. The circuit eliminates the effects of contact bouncing and electrical noise from the operation of the circuit. The circuit further provides an economical means of promoting and prolonging the effective engagement of the switch contacts by temporary partial fusion thereof. Further, the circuit is not adversely effected if the switches are left open for prolonged periods of time. Furthermore, no current path is completed as a principle when there is no change in the position of the contacts, thus reducing power consumption. Numerous modifications will become possible for those skilled in the art after receiving the teachings of the present disclosure without departing from the scope thereof.

What is claimed is:

1. A switch circuit comprising:
   a D.C. power source having first and second ends;
   a first resistor, a second resistor and a first capacitor connected in series across the first and second ends of the power source in such a manner that the capacitor is connected between the first and second resistors;
   a second capacitor connected at a second end thereof to the second end of the power source; and
   a mechanical switch means for selectively connecting a first end of the second capacitor to first and second ends of the first capacitor which are connected to the first and second resistors respectively.

2. A switch circuit as in claim 1, further comprising a third capacitor connected across the first and second ends of the power source.

3. A switch circuit as in claim 1, further comprising a low-pass filter connected across the second capacitor.

4. A switch circuit as in claim 3, in which the low-pass filter comprises a third resistor and a fourth capacitor connected in series in such a manner that the third resistor is connected to the first end of the second capacitor and the fourth capacitor is connected to the second end of the power source, the third resistor and the fourth capacitor constituting a first stage of the low-pass filter.

5. A switch circuit as in claim 4, in which the low-pass filter further comprises a fourth resistor and a fifth capacitor connected in series in such a manner that the fourth resistor is connected through the third resistor to the first end of the second capacitor and the fifth capacitor is connected to the second end of the power source, the fourth resistor and the fifth capacitor constituting a second stage of the low-pass filter.

6. A switch circuit as in claim 1, further comprising a snap action circuit having an input connected between the first end of the second capacitor and the second end of the power source.

7. A switch circuit as in claim 6, in which the snap action circuit has a high input impedance.

8. A switch circuit as in claim 6, in which the snap action circuit comprises a Schmitt trigger.

9. A switch circuit as in claim 8, in which the Schmitt trigger comprises first and second cross-coupled inverters.

10. A switch circuit as in claim 8, in which the Schmitt trigger further comprises an integrating circuit connected between an output of the first inverter and an input of the second inverter, the snap action circuit further comprising an exclusive OR gate having inputs connected to outputs of the first and second inverters.

11. A switch circuit as in claim 1, in which the mechanical switch means comprises a first reed switch connected between the first end of the second capacitor and the first end of the first capacitor and a second reed switch connected between the first end of the second capacitor and the second end of the first capacitor.

12. A switch circuit as in claim 1, further comprising a sixth capacitor connected between the first end of the power source and the first end of the second capacitor.

13. A switch circuit as in claim 5, further comprising a seventh capacitor connected between the first end of the power source and a junction of the third resistor and fourth capacitor.

14. A switch circuit as in claim 13, further comprising an eighth capacitor connected between the first end of the power source and a junction of the fourth resistor and the fifth capacitor.

* * * * *